United States Patent
Gharpure et al.

(10) Patent No.: US 11,726,548 B1
(45) Date of Patent: Aug. 15, 2023

(54) ADJUSTABLE POWER CAPACITY POWER SUPPLY UNIT (PSU) SYSTEM AND METHOD

(71) Applicant: Dell Products, L.P., Round Rock, TX (US)

(72) Inventors: Padmanabh R. Gharpure, De Pere, WI (US); Wayne Kenneth Cook, Round Rock, TX (US); Wei-Jun Feng, Braintree, MA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/660,859

(22) Filed: Apr. 27, 2022

(51) Int. Cl.
  *G06F 1/3296* (2019.01)
  *G06F 21/31* (2013.01)
  *G06F 9/30* (2018.01)
  *G06F 1/3228* (2019.01)

(52) U.S. Cl.
  CPC .......... *G06F 1/3296* (2013.01); *G06F 1/3228* (2013.01); *G06F 9/30083* (2013.01); *G06F 21/31* (2013.01)

(58) Field of Classification Search
  CPC .. G06F 1/3296; G06F 1/3228; G06F 9/30083; G06F 21/31
  See application file for complete search history.

(56) References Cited

U.S. PATENT DOCUMENTS

| | | | | |
|---|---|---|---|---|
| 2011/0191618 A1* | 8/2011 | Berke | ..................... | G06F 11/30 713/340 |
| 2020/0114098 A1* | 4/2020 | Bath | ................. | A61M 16/0003 |

* cited by examiner

*Primary Examiner* — Terrell S Johnson
(74) *Attorney, Agent, or Firm* — Fogarty LLP

(57) ABSTRACT

According to one embodiment, an adjustable power capacity Power Supply Unit (PSU) includes a circuit coupled within a feedback loop of the PSU that is controlled by an internal processing system. The feedback loop configured to carry a feedback signal for regulating an output power of the PSU. The processing system includes executable instructions that may be executed to receive an output power capacity set point that represents a programmed output power rating of the PSU, and control the circuit to modify the feedback signal so that the PSU generates output power at the programmed output power rating. The programmed output power rating set on the PSU being less than an actual output power rating of the PSU.

20 Claims, 7 Drawing Sheets

| OUTPUT POWER SETTING (F7H) |||
|---|---|---|
| BYTES | DEFINITION | NOTE |
| 0 | CURRENT SET OUTPUT POWER (CURRENT PS SETTING) | READ/WRITE (SEE NOTE 1) |
| 1 | | |
| 2 | OUTPUT POWER MAXIMUM | READ ONLY |
| 3 | | |
| 4 | OUTPUT POWER MINIMUM | READ ONLY |
| 5 | | |
| 6 | OUTPUT POWER ADJUSTMENT INCREMENT | READ ONLY |
| 7 | | |

| MULTIPLE CAPACITY PSU | | | | |
|---|---|---|---|---|
| F1H | PSU MANUFACUTRING | | | |
| BITS | NAME | VALUE | DESCRIPTION | NOTE |
| 5:7 | RESERVED | | RESERVED | RESERVED |
| 4 | INVALID POWER SETTING (READ/WRITE) | 1 | INVALID SETTING | |
| | | 0 | VALID | |
| 3 | OUTPUT POWER ADJUSTMENT CAPABILITY (READ ONLY) | 1 | CAPABLE | |
| | | 0 | NOT CAPABLE | |
| 2 | OUTPUT POWER ADJUSTMENT (READ ONLY) | 1 | SET | OUTPUT POWER ADJUSTMENT CAN BE SET |
| | | 0 | OFF | OUTPUT POWER ADJUSTMENT IS OFF (DEFAULT). |
| 1 | DISABLE PSU FAN | 0 | ENABLE PSU FAN CONTROL | PSU FAN OPERATES IN NORMAL MODE |
| | | 1 | DISABLE PSU FAN CONTROL | FAN MUST KEEP OFF IF THIS BIT IS SET |
| 0 | PSU MANUFACTURING FAN POWER PIN CONFIGURATION | 0 | MANUFACTURING FAN PIN IS NOT CONFIGURED FOR USE BY END SYSTEM (DEFAULT). | THE SETTING OF BIT 0, SUPERSEDES THE FAN OVERRIDE BEHAVIOR CALLED OUT IN SEC. 4.6.1. FAN OVERRIDE BEHAVIOR OF ESG 15G POWER SUPPLY BEHAVIORAL SPECIFICATION (DP/N ENG0019024) |
| | | 1 | MANUFACTURING END PIN IS CONFIGURED FOR USE BY END SYSTEM | |

FIG. 3B

| 7EH | STATUS_CML | | | | | | |
|---|---|---|---|---|---|---|---|
| BITS | NAME | DESCRIPTION | LATCHING | STATUS VALUE 0 = NO EVENT OCCURRED 1 = EVENT OCCURRED | | SMBALERT_ MASK DEFAULT 0 = CAUSES ASSERTION OF SMBALERT# 1 = DOES NOT CAUSE ASSERTION OF SMBALERT# | |
| | | | | PAGE 00H (BMC/iDRAC) | PAGE 01H (ME/NM) | PAGE 00H (BMC/iDRAC) | PAGE 00H (BMC/iDRAC) |
| 7 | INVALID/ UNSUPPORTED COMMAND | SLAVE RECEIVED A INVALID OR UNSUPPORTED COMMAND. | YES | 0/1 | 0/1 | 1 | 1 |
| 6 | INVALID/ UNSUPPORTED DATA | IPM2 DATA FORMAT ERROR OCCURRED. | YES | 0/1 | 0/1 | 1 | 1 |
| | PACKET ERROR CHECK FAILED | SLAVE RECEIVED AN ERROR PEC CODE. NOTE: THIS BIT MUST BE UPDATED WITHIN 100USEC FROM TIME PEC ERROR IS DETECTED. | YES | 0/1 | 0/1 | 1 | 1 |
| | *NOT IMPLEMENTED* | | N/A | 0 | 0 | 1 | 1 |
| | *NOT IMPLEMENTED* | | N/A | 0 | 0 | 1 | 1 |
| | *NOT IMPLEMENTED* | | N/A | 0 | 0 | 1 | 1 |
| | OTHER COMMUNICATION FAULT[1] | FAILED TO COMMUNICATION BETWEEN PRIMARY AND SECONDARY DSP | YES | 0/1 | 0/1 | 1 | 1 |
| | *NOT IMPLEMENTED* | | N/A | 0 | 0 | 1 | 1 |

ADJUSTABLE POWER CAPACITY POWER SUPPLY UNIT (PSU) SYSTEM AND METHOD

BACKGROUND

As the value and use of information continues to increase, individuals and businesses seek additional ways to process and store information. One option available to users is information handling systems (IHSs) to be general or configured for a specific user or specific use such as financial transaction processing, airline reservations, enterprise data storage, or other systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information aware communications. In addition, information handling systems may include a variety of hardware and software components that may be configured to process, store, and communicate information and may include one or more computer systems, data storage systems, and networking systems.

Modern large scale IHSs (e.g., datacenters, server farms, etc.) often employ a large number of servers to handle processing needs for various services. These servers are typically arranged within racks or other organized enclosures. To save space, servers inside a rack often share one or more Power Supply Unit (PSU), which are typically mounted such that PUSs are accessible to service personnel without necessity of powering down the rack or server. In many cases, the power needs of the rack are provided by multiple, redundant PSUs. When pooling such PSUs, distribution of power may be provided by a Power Distribution Unit (PDU) that receives and processes voltage and current sharing signals from each PSU so that it can perform load sharing among each of the PSUs.

SUMMARY

According to one embodiment, an adjustable power capacity Power Supply Unit (PSU) includes a circuit coupled within a feedback loop of the PSU that is controlled by an internal processing system. The feedback loop configured to carry a feedback signal for regulating an output power of the PSU. The processing system includes executable instructions that may be executed to receive an output power capacity set point that represents a programmed output power rating of the PSU, and control the circuit to modify the feedback signal so that the PSU generates output power at the programmed output power rating. The programmed output power rating set on the PSU being less than an actual output power rating of the PSU.

According to another embodiment, a method includes the steps of receiving, by an adjustable power capacity Power Supply Unit (PSU), an output power capacity set point that represents a programmed output power rating of the PSU, and controlling the circuit to modify the feedback signal so that the PSU generates output power at the programmed output power rating. The PSU includes a circuit coupled within a feedback loop of the PSU in which the feedback loop carries a feedback signal for regulating an output power of the PSU. The programmed output power rating being less than an actual output power rating of the PSU.

According to yet another embodiment an Information Handling System (IHS) configured with a processor and memory in which the memory has instructions that when executed, causes the HS to receive an output power capacity set point that represents a programmed output power rating of a Power Supply Unit (PSU) having a circuit coupled within a feedback loop, and control the circuit to modify the feedback signal so that the PSU generates output power at the programmed output power rating. The feedback loop is configured to carry a feedback signal for regulating an output power of the PSU, and wherein the programmed output power rating is less than an actual output power rating of the PSU.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 2 illustrates certain elements of an information handling system that may be used to implement the adjustable power capacity PSU system according to one embodiment of the disclosure.

FIGS. 3A, 3B, and 3C illustrates several example registers that may be used to implement the adjustable power capacity PSU system according to one embodiment of the disclosure.

DETAILED DESCRIPTION

Figure 1:
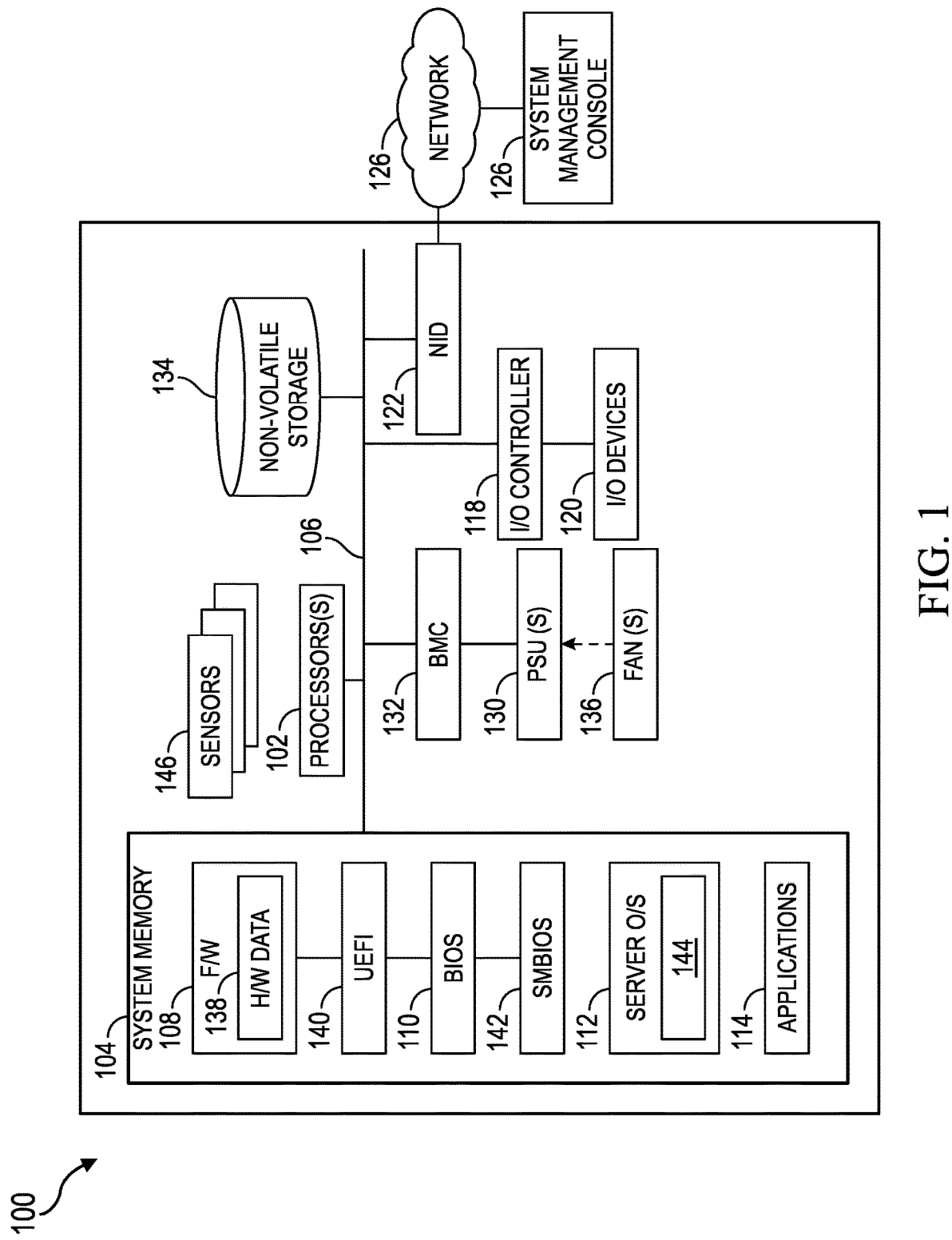
FIG. 1 is a block diagram of examples of several hardware devices of an Information Handling System (IHS) that may be used to implement the adjustable output power capacity PSU system according to one embodiment of the present disclosure.

Power Supply Units (PSUs) have heretofore been provided with a fixed single output power capacity or a fixed output power capacity for variable input voltage ranges (e.g., high line, low line, etc.). Certain users (e.g., telecom providers) often require a PSU to have an output power capacity that matches their infrastructure ratings. As such, PSUs with a higher rated capacity cannot be used. To support such implementations, a PSU with a higher power rated capacity can be scaled down to be rated at the lower required output power rating. For example, an 1100 Watt,−48 Volt (DC) PSU can be re-designed to be rated at 800 Watts. Such a re-design, however, requires certain changes to the PSU's design, both in hardware (HW) and in firmware (FW). These design changes, although minor, can make it necessary for the PSU to undergo re-validation and/or agency re-certification.

The changes required may include scaling a current feedback signal (e.g., Imon) to match the rated capacity so that the calibration factor remains at a specified level (e.g., 2.5 milli-Amperes) when operating at 100 percent (%) load. To make this work, certain hardware changes may also be required, such as changing resistor values to maintain the calibration scaling at the specified level in the current feedback signal, which is an analog controlled signal. Firmware changes may also be necessary to support the newly scaled down capacity. Re-certification with certain regulatory agencies may also be required. Due to the above mentioned changes, the time to market (TTM) may be relatively long, a situation where the IHS provider could lose potential business to its competitors. Current PSU architectures often require certain hardware changes to calibrate a PSU to match its capacity, such as via current feedback signals (e.g., Imon, iShare) so when a lower capacity PSU is required, a sample build with hardware changes is often required. This PSU development may increase cycle time for obtaining initial samples and may also require that the PSU go through regulatory submittal.

As will be described in detail herein below, embodiments of the present disclosure provide an adjustable power capacity Power Supply Unit (PSU) that has a programming capability whereby the PSU's output power can easily be programmed to operate at lower output power ratings. Thus, the PSU's output power rating may be adjusted following development in a manner that may negate the need for the costly, time consuming processes described above. In most cases, the final output power rating could be set at the manufacturer's facility. The adjustable power capacity PSU, nevertheless, may also include a backdoor in-system capability that is password protected to prevent unauthorized changes.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), network storage device, or any other suitable device and may vary in size, shape, performance, functionality, and price.

The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of several hardware devices of an Information Handling System (IHS) that may be used to implement the adjustable output power PSU system according to one embodiment of the present disclosure. Particularly, IHS 100 includes one or more processor(s) 102 coupled to system memory 104 via system interconnect 106. System interconnect 106 may include any suitable system bus. System memory 104 may include multiple software and/or firmware modules including firmware (F/W) 108, basic input/output system (BIOS) 110, server operating system (OS) 112, and/or application(s) 114. Software and/or firmware module(s) stored within system memory 104 may be loaded into processor(s) 102 and executed during operation of IHS 100.

F/W 108 may include hardware device data 138 that is used to store information associated with certain hardware devices (e.g., processor(s) 102, system memory 104, non-volatile storage 134, NID 122, I/O controllers 118, power supply unit(s) 130, Fan(s) 136, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of IHS 100. This feature can eliminate the need for the operating system to probe hardware directly to discover what devices are present in the computer.

IHS 100 includes one or more input/output (I/O) controllers 118 which support connection by and processing of signals from one or more connected input/output (I/O) device(s) 120, such as a keyboard, a mouse, a touch screen, a microphone, a monitor or a display device, a camera, a microphone, audio speaker(s) (not shown), an optical reader, a universal serial bus (USB), a card reader, a Personal Computer Memory Card International Association (PCM-CIA) slot, and/or a high-definition multimedia interface (HDMI) that may be included or coupled to IHS 100.

IHS 100 also includes a Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more PSUs 130. PSUs 130 power the hardware devices of IHS 100 (e.g., processor(s) 102, system memory 104, non-volatile storage 134, NID 122, I/O controllers 118, I/O devices 120, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may include a baseboard processor, or other microcontroller, that operates management software for supporting remote monitoring and administration of IHS 100. BMC 132 may be installed on the motherboard of IHS 100 or may be coupled to IHS 100 via an expansion slot provided by the motherboard. In support of remote monitoring functions, NID 122 may support connections with BMC 132 using wired and/or wireless network connections via a variety of network technologies. In other embodiments, BMC 132 may include or may be an integral part of a Chassis Management Controller (CMC). As a non-limiting example, the BMC 132 may include an integrated Dell Remote Access Controller (iDRAC) from Dell® embedded within Dell PowerEdge™ servers. The iDRAC provides functionality that helps information technology (IT) administrators deploy, update, monitor, and maintain servers remotely, such as via system management console 126. Additionally, the server O/S 112 may include a BMC service module 144 that interfaces with BMC 132 to perform, among other things, managing the hardware devices of IHS 100 from the O/S 112 using in-band management connection. BMC service module 144 will be discussed in detail herein below.

BMC 132 may be configured to provide out-of-band management facilities for IHS 100. Management operations may be performed by BMC 132 even if IHS 100 is powered off, or powered down to a standby state. BMC 132 may include an out-of-band network interface separate from and physically isolated from an in-band network interface of IHS 100, and/or other embedded resources. In one embodiment, BMC 132 may support monitoring and administration of the hardware devices of IHS 100 via a sideband bus interface, such as an I2C sideband bus that may be individually established with some, most, or all of the respective hardware devices.

Figures 2, 3A:
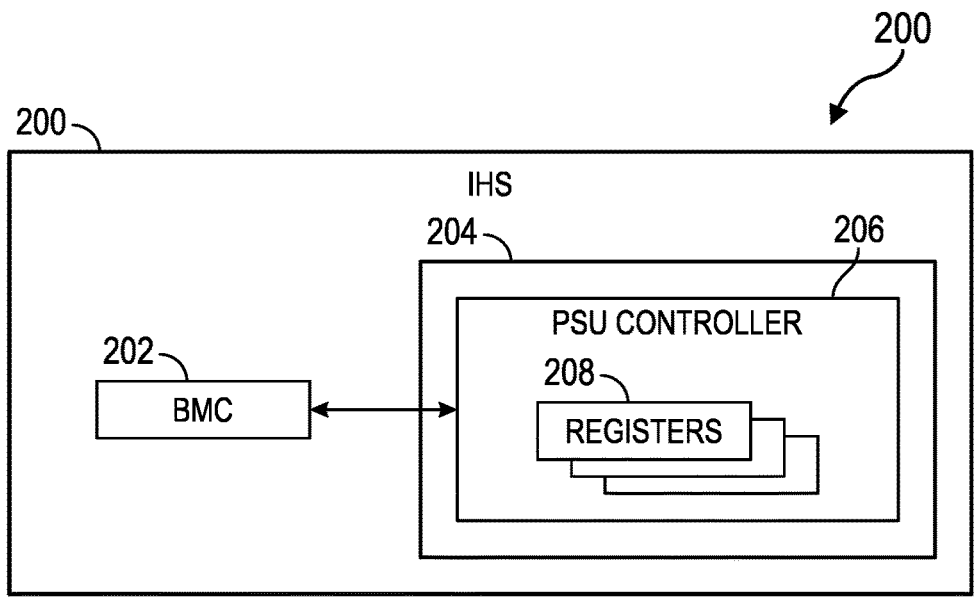

Information handling system 100, for example, may include any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the IHS 100 can be implemented using electronic devices that provide voice, video, or data communication. Further, while a single information handling system 100 is illustrated, the term "system" shall also be taken to include any collection of systems or subsystems that individually or jointly execute a set, or multiple sets, of instructions to perform one or more computer functions.

FIG. 2 illustrates certain elements of an information handling system 200 that may be used to implement the adjustable power capacity PSU system according to one embodiment of the disclosure. The IHS 200 includes a BMC 202, and a PSU 204 that may be similar in design and construction to the BMC 122 and PSU 130 as described above with reference to FIG. 1. As shown, the BMC 202 communicates with the PSU 204 via an I2C connection. In other embodiment, however, BMC 202 may communicate with the PSU 204 using any suitable connection, such as an Ethernet connection. The PSU 204 is configured with a PSU controller 206 that is used to control the operation of the PSU 204. For example, the PSU controller 206 may include instructions (e.g., firmware) stored in a memory and a processor for executing the instructions for providing the various features of the adjustable power capacity PSU system described herein.

The BMC 202 communicates with the PSU 204 to adjust its output power rating that the PSU 204 is to provide using a programmed output power rating value stored in the registers. The BMC 202 in turn, may be controlled by an external controller, such as the system management console 126 (FIG. 1), to adjust the programmed output power rating value in the PSU 204. In one embodiment, the external controller may be used in a manufacturing setting where the programmed output power rating is set when the PSU 204 is originally manufactured. In another embodiment, the external controller may communicate with the BMC 202 via a wired or wireless connection, such as an Internet connection, to allow the programmed output power rating to be set in the PSU 204. For example, the system management console 126 may be used to remotely communicate with the PSU 204 after it has been deployed in a data center via an Internet connection.

The PSU controller 206 also includes several registers 208 for storing information that the PSU controller 206 uses to control the operation of the PSU 204. For example, one register may include an adjustable output power register set (FIG. 3A) for storing, among other things, information about a programmed output power rating of the PSU 204. Another register may include a configuration settings register (FIG. 3B) for storing certain settings associated with the programmed output power rating of the PSU 204, and a status register (FIG. 3C) for storing information about the operational status of the PSU 204.

Referring now to FIG. 3A, the adjustable output power register set stores a programmed output power rating that may be written by an external controller, such as the systems management console 126, via the BMC 202. In particular, bytes 0 and 1 of the adjustable output power register set show the current output power setting of the power supply. In normal operation these bytes are a read only field and only during a passcode protected login session may this value be changed. Bytes 2-7 of the adjustable output power register set, however, are all fixed values of the power supply that show the maximum, minimum and acceptable incremental power steps that are allowed.

Bytes 2 and 3 of the adjustable output power register set store an output power maximum value, bytes 4 and 5 store an output power minimum value, while bytes 6 and 7 store an output power adjustment increment value. The output power maximum value refers generally to an actual maximum level of output power level that can be generated by the PSU 204 and is typically based on the architecture (e.g., physical makeup) of the PSU 204. The output power minimum value generally refers to the lowest programmed output power rating that would be recommended for the PSU 204. For example, if the PSU 204 is designed to provide an actual maximum output power rating of 1100 Watts, the output power minimum value may be set to 700 Watts so that the underlying architecture of the PSU 204 is not unduly underutilized. The output power adjustment increment value refers to a minimum incremental value that the PSU 204 may be set to. For example, if the minimum incremental value is set to 100 Watts, the output power value is set to 1100 Watts, and the output power minimum value is set to 700 Watts, then allowable programmed output power rating may be 700 Watts, 800 Watts, 900 Watts, 1000

Watts, or 1100 Watts. That is, if the programmed output power rating is attempted to be set at another value, such as 890 Watts, the system would reject such a setting as invalid.

Referring now to FIG. 3B, a configuration settings register is shown. The configuration settings register occupies a single byte (e.g., F1h) in which bit 2 is an output power adjustment bit, bit 3 is an output power adjustment capability bit, and bit 4 is an invalid setting bit. The output power adjustment bit may be set to logic '1' to indicate that the programmed output power rating in the PSU 204 is settable, and set to logic '0' otherwise. This bit is read-only because the settability of the programmed output power rating is defined by the architecture of the PSU 204 such that certain PSUs may not be designed to have output power adjustment capabilities. The output power adjustment capability bit (bit 3) is set by the PSU to inform the BMC 202 to either allow (logic '1') or disallow (logic '0') setting of the programmed output power rating. The invalid setting bit (e.g., bit 4) is set whenever an invalid programmed output power rating is attempted to be set on the PSU 204.

Referring now to FIG. 3C, a status register is shown that stores information associated with a status of the adjustable output power rating system. The status register may occupy a byte with 8 bits in which each bit is set to logic '1' when a particular event occurs and set to logic '0' otherwise. For example, bit 1 is a communication fault bit that is set to logic '1' when a communication failure occurs, bit 5 is a packet error check failure bit that is set to a logic '1' when a packet error occurs, bit 6 is an invalid/unsupported data bit that is set to a logic '1' when a data format error occurs, while bit 7 is an invalid/unsupported command bit that is set to logic '1' when the PSU controller 206 receives an invalid or unsupported command.

Figure 4:
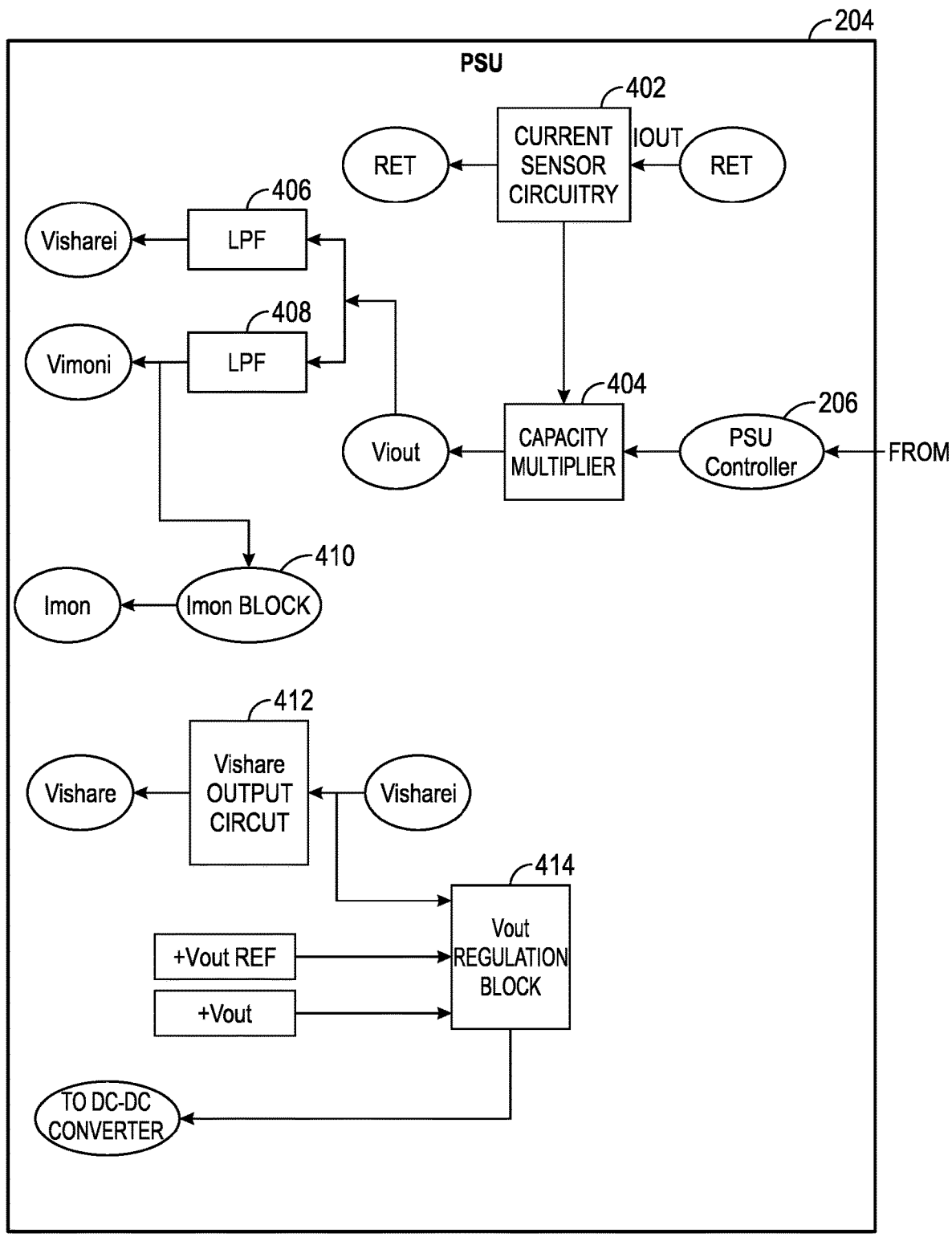
FIG. 4 illustrates certain physical building blocks of the PSU that may be used to implement the adjustable power capacity PSU system according to one embodiment of the present disclosure.

FIG. 4 illustrates certain physical building blocks of the PSU 204 that may be used to implement the adjustable power capacity PSU system according to one embodiment of the present disclosure. The building blocks of the PSU 204 generally include a current sensing circuit 402, a capacity multiplier 404, a Visharei low pass filter 406, a Vimoni low pass filter 408, and an Imon block 410, a Vishare Output Circuit 412, and a Vout regulation block 414. While it should be appreciated that the PSU 204 includes other building blocks, only the current sensing circuit 402, capacity multiplier 404, Visharei low pass filter 406, Vimoni low pass filter 408, and Imon block 410 are shown and described for purposes of brevity and clarity of disclosure.

The current sensing circuit 402 is coupled within the feedback loop of the PSU 204 that is used to regulate the power outputted by the PSU 204. That is, the current sensing circuit 402 may be coupled in series with one of the power rails, such as the ground line or output power line (e.g., 12.0 Volt line), of the PSU 204 so that the current generated by the PSU 204 may be continually monitored and regulated. The current sensing circuit 402 may include any suitable components. For example, the current sensing circuit may include a low-valued shunt resistor (e.g., 0.0001 Ohms) and an operational amplifier for generating a voltage signal proportional to the current generated by the PSU 204. In general, the current sensing circuit 402 senses the PSU output current and produces an analog signal (e.g., voltage) proportional to output current of the PSU. In some cases, the current sensing circuit 402 may also include an amplifier to boost the signal that is fed to the capacity multiplier 404. The bandwidth (BW) of the amplifier may be at least 100 KHz to reduce delays.

The capacity multiplier 404 operates under control of the PSU controller to adjust an output of the current sensing circuit 402 to generate a voltage proportional to output current (Viout) signal, which is then fed to the inputs of the Visharei low pass filter 406 and Vimoni low pass filter 408. The Visharei low pass filter 406 and Vimoni low pass filter 408 receives the Viout signal and generate a Visharei signal and Vimoni signal, respectively. Visharei is a signal which eventually goes out as Vishare after scaling to match capacity of the PSU. This signal from all PSUs is tied together as an Ishare (current share) bus. Vimoni is a signal which also represents output current with a suitable scale factor that may be, for example, 10 Volts at 200 percent (%) capacity.

To make the PSU capacity programmable, Viout is passed through the capacity multiplier circuit 404, which is firmware controlled. The capacity multiplier circuit 404 receives information associated with a desired programmed output power capacity from the server via the PSU controller 204. If the programmed output power capacity is the same as the current value (e.g., same as actual output power capacity), no action is taken, and a multiplier within the capacity multiplier 404 is set to 1.0. If, however, the capacity multiplier 404 receives a command to reduce the capacity a level proportionally less than the actual output power capacity (e.g., going from 1000 W to 800 W), the multiplier gets set to 1/0.8 by the PSU controller 204. So the Viout signal is scaled proportionately to maintain the calibration of both Visharei and Vimoni signals at 10V at 200% load, which in this case will be 1600 W instead of 2000 W. In one embodiment, the LPFs 406, 408 have different bandwidths because Visharei may requires a lower bandwidth as it controls voltage loop, where Vimoni needs a higher bandwidth as it is expected to represent the output current in real time.

In addition to adjusting Viout signal to match desired PSU capacity, the capacity multiplier 404 may also adjust other parameters that should be scaled along with the programmed output power capacity. For example, each PSU 204 typically generates and processes its own over current warnings (OCW). These OCWs are used to alert the server that its respective PSU 204 is approaching or reaching threshold limits to avoid PSU shutting down due to over current condition. The Capacity Multiplier 404 may adjust these limits by using the scaling factor to match desired capacity.

The capacity multiplier 404 may also vary a bulk voltage, which is the operating voltage on the energy storage capacitor of the PSU 204. The bulk voltage is derived from a boost circuit of the PSU 204 to a higher voltage value in a capacitor. The bulk capacitor may also function as an energy reservoir, which supplies energy to the PSU 204 for a defined amount of time, generally between 1-10 milliseconds in case of input power loss. The bulk voltage is set based on 100% load to optimize losses in the circuit to maintain conversion efficiency at a desired point and is scaled down in certain steps as the load is proportionally reduced. With reduction in capacity, therefore, the bulk voltage should also be adjusted. Additionally, the amount of reduction is unique to each design, so the bulk voltage increments may be set accordingly.

The Imon Block 410 is an analog current source which produces a current proportional to the load. It is calibrated to provide 2.5 milli-Amperes at full (e.g., 100%) load. The Imon block 410 output is clamped at 5.0 milli-Amperes for double load (e.g., 200%) and above. This current may be sourced into a resistor (e.g., 2.0 Kilo-ohms) on the IHS 200 mother board to obtain 5V at full (100%) load. This is a real time representation of actual output current with delay of less than 100 ns and is used by the IHS 200 for power management.

The Vishare Output Circuit 412 receives the Visharei signal and processes it to generate a Vishare output signal. The Vishare output circuit 412 may include certain subsections, such as a compensator sub-section, a limiter and droop regulation control sub-section, and a comparator sub-section with a specified gain that varies with each design to obtain a signal which controls the output of the PSU 204.

Figure 5:
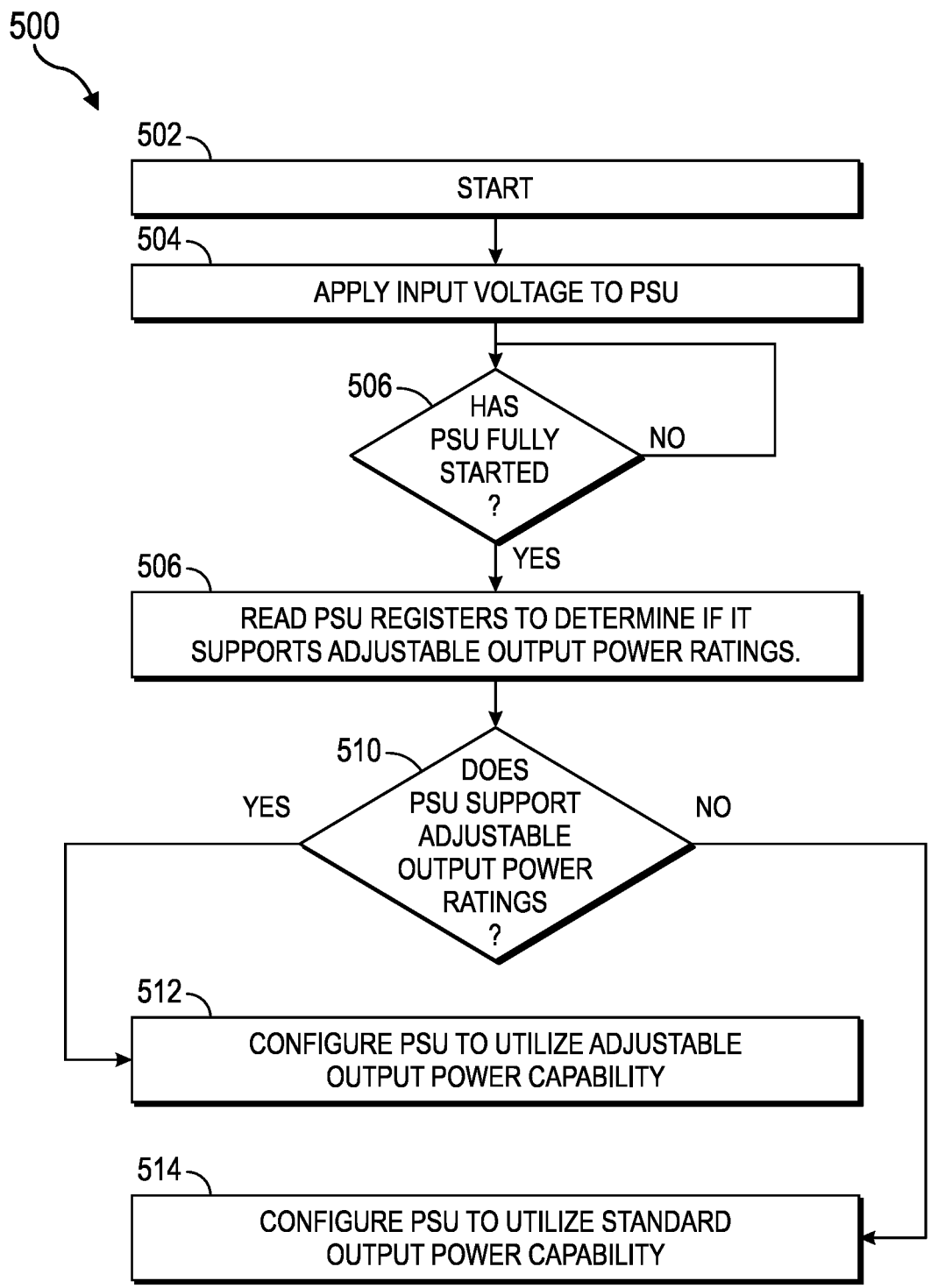
FIG. 5 illustrates an initialization method that may be performed to initialize the PSU for having its programmed output power rating to be adjusted according to one embodiment of the present disclosure.

FIG. 5 illustrates an initialization method 500 that may be performed to initialize the PSU 204 for having its programmed output power rating to be adjusted according to one embodiment of the present disclosure. In one embodiment, the method 500 is performed by a processor, such as that included in the PSU controller 206 of FIG. 2. Additionally or alternatively, the steps of the method 500 may be performed by the PSU controller 206 and/or the system management console 126 via the BMC 202 of the IHS 200. In one aspect, the method 500 may be performed at the manufacturer's facility; that is, when the PSU 204 is manufactured. In another aspect, the method 500 may be performed in the field using a backdoor in-system capability that is password protected to prevent unauthorized changes.

At step 502, the method 500 starts. Thereafter at step 504, the PSU controller 206 senses input voltage to the PSU 204 such that the PSU 204 is capable of powered on. At step 506, the system management console 126 determines whether the PSU has fully started. That is, the system management console 126 may wait to proceed to the next step until the PSU 204 is fully started before proceeding to step 508. For example, the PSU controller 206 may continually monitor a Vin_Good signal that is asserted to a logic '1' when the PSU 204 has become fully operational, and transmit a message including this information to the system management console 126. In such a manner, the system management console 126 may wait to proceed to the next step until the PSU 204 is fully started before proceeding to step 508.

At step 508, the system management console 126 reads the PSU registers 208 to determine if it supports adjustable output power ratings. For example, the system management console 126 may read bit 3 of the configuration settings register, which stores information associated with whether the PSU 204 supports adjustable output power ratings. Thereafter at step 510, the system management console 126 determines whether the PSU 204 supports adjustable output power ratings and configures the PSU 204 to utilize adjustable output power capability if so at step 512, and configures the PSU 204 to utilize the standard output power capability otherwise at step 514.

The aforedescribed process may be performed at any time to initialize the PSU 204 for being programmed with an adjustable output power rating, such as following manufacture at a manufacturing facility, or at any time during the serviceable lifecycle of the PSU 204. Nevertheless, when use of the method 500 is no longer needed or desired, the process ends.

Figure 6:
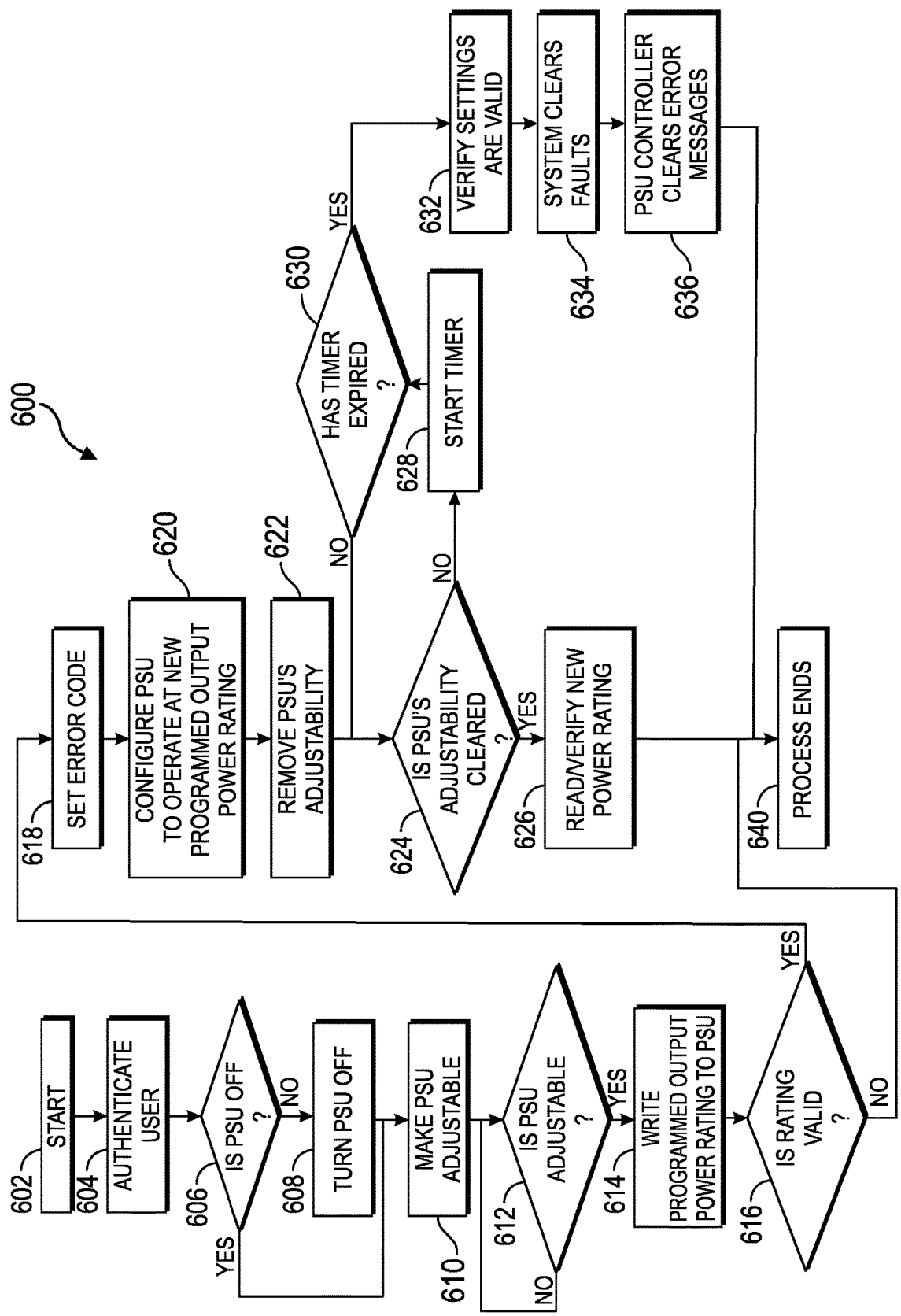
FIG. 6 illustrates a power capacity adjustment method that may be performed to adjust the programmed output power capacity of the PSU according to one embodiment of the present disclosure.

FIG. 6 illustrates a power capacity adjustment method 600 that may be performed to adjust the programmed output power capacity of the PSU 204 according to one embodiment of the present disclosure. Additionally or alternatively, the steps of the method 600 may be performed by the PSU controller 206, which is under the control of the system management console 126 via the BMC 202 of the IHS 200. The method 600 may be performed at any suitable time, such as after the initialization method 500 has been performed.

At step 602, the method 600 starts. Thereafter at step 604, the system management console 126 authenticates with the PSU 204. For example, the system management console 126 may authenticate with the PSU 204 by transmitting a passcode (e.g., public or private key) to the PSU controller 206, which then verifies its authenticity. In one embodiment, the public or private key is known only by the manufacturer of the PSU 204.

At step 606, the PSU controller 206 determines whether the PSU 204 is off. If so, processing continues at step 610; otherwise the method continues at step 608 in which the PSU controller 206 turns the PSU 204 off. Ensuring that the PSU 204 is off may be beneficial in that adjusting the output capacity rating of the PSU 204 or other components powered by the PSU 204 could be potentially damaged if the maximum output capacity rating is reduced while the PSU 204 while it is running.

The PSU controller 206 then makes the PSU 204 to be adjustable at step 610. For example, the PSU controller 206 may set bit 2 of the configuration settings register to logic '1'. Thereafter at step 612, the system management console 126 ensures that the PSU 204 has been made adjustable. For example, the system management console 126 may pause the method 600 by polling bit 2 of the configuration settings register until it has been asserted.

At step 614, the system management console 126 writes the programmed output power rating to the PSU 204. For example, the system management console 126 may write a programmed output power rating via the BMC 202 to bytes 0 and 1 of the adjustable output power register set 300. The PSU controller 206 then ensures that the received output power rating is valid at step 616. For example, the PSU controller 206 may access the output power value stored in bytes 2 and 3 of the adjustable output power register set 300 to ensure that this value is not exceeded. As another example, the PSU controller 206 may access the output power minimum value stored in bytes 4 and 5 of the adjustable output power register set 300 to ensure that the programmed output power rating is not too low. As yet another example, the PSU controller 206 may access the output power adjustment increment value stored in bytes 6 and 7 of the adjustable output power register set 300 to ensure that the programmed output power rating is within a specified incremental value.

If at step 616 the received output power rating is invalid, processing continues at step 618 where the PSU controller 206 generates one or more error messages and exits the method at step 640. The PSU controller 206 may generate any suitable number and type of error messages that can be read and processed by any authorized user. For example, the PSU controller 206 may set bit 4 of the configuration settings register indicating that an invalid output power setting was attempted and/or set bit 6 of the status register indicating that a data format error has occurred.

If the received output power value is valid, the PSU controller 206 may then at step 620 configure the PSU 204 to operate at the new programmed output power rating. For example, the PSU controller 206 may communicate with the capacity multiplier 404 and Imon block 410 to adjust their operation. The PSU controller 206 may also adjust Over Current Warnings (OCWs) so that any potential over-current warnings are triggered at their proper thresholds. The PSU controller 206 may additionally adjust how the bulk capacitor is loaded with its bulk voltage based on the new programmed output power rating.

Thereafter at step 622, the PSU controller 206 removes the PSU's adjustability, such as by clearing bit 2 of the configuration settings register. The system management console 126 then begins to poll for the PSU controller 206 to complete its task. At step 624, the PSU controller 206 determines if the PSU's adjustability is cleared. If the PSU controller 206 is finished, processing continues at step 626 in which the PSU controller 206 reads and verifies its new output power rating and exits the method 600 at step 640. If, however, the PSU controller 126 is not finished, a timer is started at step 628 in which the system management console 126 continually monitors the PSU controller 126 at steps 630 to poll for the completion of the PSU controller's task. If the timer expires the system management console 126 will proceed to read the status register and configuration settings register to determine if bad data was received by the PSU controller 206 at step 632, clear any faults at step 634, and send a clear bit command to the PSU controller 126 at step 636. In such a case, the PSU controller 206 will clear the bits and the system can restart the process if needed to update the power supply capability. Thereafter at step 640, the method 600 ends.

In certain cases, a unique manufacturer part number, regulatory model number, and device rating label (DRL) may be needed for each capacity. In this manner, when an order is placed for a specific part number, the PSU manufacturer can set the capacity based on PSU PPID on the DRL, which includes the PSU part number. The PSU can then have a common firmware set for the maximum output power capacity during factory testing during manufacture, and later on at a stage suitable in the process the programmed output power capacity can be set to match the PSU part number. Additionally, the PSU firmware can be protected so that the capacity cannot be changed by anyone other than PSU manufacturer using a passcode/password protected login session.

Although FIGS. 5 and 6 describe example methods 500, 600 that may be performed for initializing and adjusting an output power rating of a PSU 204, the features of the methods 500, 600 may be embodied in other specific forms without deviating from the spirit and scope of the present disclosure. For example, the method 500, 600 may perform additional, fewer, or different operations than those described in the present examples. As another example, the steps of the aforedescribed method 500, 600 may be performed in a sequence other than what is described above. As yet another example, the steps of the methods 500, 600 may be performed by components other than the system management console 126 and/or PSU controller 206 without departing from the spirit and scope of the present disclosure.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included in IHS 100, and/or within the processor 102 during execution by the IHS 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board rating product having portions thereof that can also be any combination of hardware and software.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An adjustable power capacity Power Supply Unit (PSU), comprising:
a circuit coupled within a feedback loop of the PSU, the feedback loop configured to carry a feedback signal for regulating an output power of the PSU;
a processor coupled to the circuit; and
a memory coupled to the processor, the memory having instructions stored thereon that, upon execution by the processor, cause the processor to:
receive an output power capacity set point that represents a programmed output power rating of the PSU, wherein the programmed output power rating is less than an actual output power rating of the PSU; and
control the circuit to modify the feedback signal so that the PSU generates output power at the programmed output power rating.

2. The PSU of claim 1, wherein the instructions, upon execution, further cause the PSU to receive the output power capacity set point from a system management console via a Baseboard Management Controller (BMC) configured in an Information Handling System (IHS) that is powered by the PSU.

3. The PSU of claim 2, wherein the instructions, upon execution, further cause the processor to:
store capability information associated with whether or not the PSU is able to be programmed to operate at the programmed output power rating; and
transmit the capability information to the system management console.

4. The PSU of claim 2, wherein the instructions, upon execution, further cause the processor to:
store the output power capacity set point persistently hi the memory; and
in response to a request from the system management console, transmit the output power capacity set point to the BMC.

5. The PSU of claim 1, wherein the instructions, upon execution, further cause the processor to only allow the programmed output power rating to be set during a password protected login session.

6. The PSU of claim 5, wherein the instructions, upon execution, further cause the processor to only allow the programmed output power rating to be set within a specified amount of time.

7. The PSU of claim 6, wherein the instructions, upon execution, further cause the processor to store capability information associated with whether or not the PSU is able to be programmed at the programmed output power rating; and
transmit the capability information to the system management console in response to a request from a system management console.

8. The PSU of claim 1, wherein the instructions, upon execution, further cause the processor to
store the output power capacity set point persistently in the memory; and
transmit the first power capacity set point to the system management console in response to a request from the system management console.

9. The PSU of claim 1, wherein the instructions, upon execution, further cause the processor to
determine whether the output power capacity set point is valid;
when the first power capacity set point is invalid, inhibit setting of the programmed output power rating and generate an error message; and
when the first power capacity set point is valid, avow setting of the programmed output power rating.

10. The PSU of claim 1, wherein the instructions, upon execution, further cause the processor to determine that the output power capacity set point is valid due to at least one of: i) the programmed output power rating associated with the output power capacity set point being less than the actual programmed output power rating; or ii) the programmed output power rating associated with the output power capacity set point being one of a specified plurality of incremental values.

11. An adjustable power capacity Power Supply Unit (PSU) method, comprising:
receiving, by an adjustable power capacity Power Supply Unit (PSU), an output power capacity set point that represents a programmed output power rating of the PSU, the PSU comprising a circuit coupled within a feedback loop of the PSU, the feedback loop configured to carry a feedback signal for regulating an output power of the PSU, the programmed output power rating being less than an actual output power rating of the PSU; and
controlling the circuit to modify the feedback signal so that the PSU generates output power at the programmed output power rating.

12. The adjustable power capacity PSU method of claim 11, further comprising receiving the output power capacity set point from a system management console via a Baseboard Management Controller (BMC) configured in an Information Handling System (IHS) that is powered by the PSU.

13. The adjustable power capacity PSU method of claim 11, further comprising allowing the programmed output power rating to be set only during a password protected login session.

14. The adjustable power capacity PSU method of claim 13, further comprising allowing the programmed output power rating to be set only within a specified amount of time.

15. The adjustable power capacity PSU method of claim 14, further comprising:
storing capability information associated with whether or not the PSU is able to be programmed at the programmed output power rating; and
transmitting the capability information to the system management console in response to a request from a system management console.

16. The adjustable power capacity PSU method of claim 11, further comprising:
   storing the output power capacity set point persistently in the memory; and
   transmitting the first power capacity set point to the system management console in response to a request from the system management console.

17. The adjustable power capacity PSU method of claim 11, further comprising:
   determining whether the output power capacity set point is valid;
   when the first power capacity set point is invalid, inhibiting setting of the programmed output power rating and generate an error message; and
   when the first power capacity set point is valid, allowing setting of the programmed output power rating.

18. The adjustable power capacity PSU method of claim 11, further comprising determining that the output power capacity set point is valid due to at least one of: i) the programmed output power rating associated with the output power capacity set point being less than the actual programmed output power rating; or ii) the programmed output power rating associated with the output power capacity set point being one of a specified plurality of incremental values.

19. An Information Handling System (IHS) comprising:
   a processor; and
   a memory coupled to the processor, the memory having instructions stored thereon that, upon execution by the processor, cause the IHS to:
      receive an output power capacity set point that represents a programmed output power rating of a Power Supply Unit (PSU) having a circuit coupled within a feedback loop, wherein the feedback loop is configured to carry a feedback signal for regulating an output power of the PSU, and wherein the programmed output power rating is less than an actual output power rating of the PSU;
      control the circuit to modify the feedback signal so that the PSU generates output power at the programmed output power rating.

20. The IHS of claim 19, wherein the instructions, upon execution, further cause the IHS to only allow the programmed output power rating to be set during a password protected login session.

* * * * *

UNITED STATES PATENT AND TRADEMARK OFFICE
CERTIFICATE OF CORRECTION

| | | |
|---|---|---|
| PATENT NO. | : 11,726,548 B1 | |
| APPLICATION NO. | : 17/660859 | |
| DATED | : August 15, 2023 | |
| INVENTOR(S) | : Padmanabh Gharpure et al. | |

It is certified that error appears in the above-identified patent and that said Letters Patent is hereby corrected as shown below:

In the Claims

In Column 13, Line 53, Claim 4, delete "store the output power capacity set point persistently hi" and insert --store the output power capacity set point persistently in-- therefor.

In Column 14, Line 21, Claim 9, delete "when the first power capacity set point is valid, avow" and insert --when the first power capacity set point is valid, allow-- therefor.

Signed and Sealed this
Twelfth Day of September, 2023

Katherine Kelly Vidal
*Director of the United States Patent and Trademark Office*